(12) United States Patent
Baas

(10) Patent No.: US 6,463,017 B1
(45) Date of Patent: Oct. 8, 2002

(54) DISC PLAYER FOR PLAYING DISCS WITH OPTICALLY STORED DATA

(75) Inventor: Dieter Baas, Auenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/581,407

(22) PCT Filed: Dec. 11, 1997

(86) PCT No.: PCT/DE97/02886

§ 371 (c)(1),
(2), (4) Date: Sep. 8, 2000

(87) PCT Pub. No.: WO99/30321

PCT Pub. Date: Jun. 17, 1999

(51) Int. Cl.[7] .............................................. G11B 7/085
(52) U.S. Cl. .................................. 369/30.23; 369/30.27
(58) Field of Search ........................... 369/30.23, 30.24, 369/30.1, 30.15, 30.27, 30.36, 32.01, 33.01, 30.11, 30.12

(56) References Cited

U.S. PATENT DOCUMENTS

| | | | | |
|---|---|---|---|---|
| 5,126,987 A | * | 6/1992 | Shiba et al. | 369/32 |
| 5,216,644 A | * | 6/1993 | Shiba et al. | 369/32 |
| 5,408,449 A | * | 4/1995 | Oh | 369/32 |
| 5,430,697 A | * | 7/1995 | Bu | 369/32 |
| 5,457,669 A | * | 10/1995 | Kim et al. | 369/32 |
| 6,262,951 B1 | * | 7/2001 | Shimizu et al. | 369/33 |

* cited by examiner

Primary Examiner—Tan Dinh
(74) Attorney, Agent, or Firm—Kenyon & Kenyon

(57) ABSTRACT

A disc player is proposed for playing discs with optically stored data on which information is digitally stored in tracks. The disc player has a read/write memory for buffering data blocks that are read into the read/write memory at a first clock rate and are read out of the read/write memory at a second clock rate. To fill the read/write memory, the first clock rate is selected to be greater than the second. The data stored in the read/write memory can be read out throughout the duration of a track jump. Moreover, an operating mode is provided in which excerpts of music pieces stored on a compact disc are played in sequence. At the first clock rate, a sufficiently large quantity of data can be stored in the read/write memory to ensure that the data can be reproduced at the second clock rate throughout the entire duration of the jump times. The track jumps can be controlled by a control unit in such a way that, depending on how the data is evaluated by the evaluation unit, jump commands are delivered to a servo unit which cause the scanning optics to make appropriate track jumps to maintain a specified volume, a specified rhythm, a specified audio frequency, etc.

8 Claims, 2 Drawing Sheets

DISC PLAYER FOR PLAYING DISCS WITH OPTICALLY STORED DATA

BACKGROUND INFORMATION

The present invention relates to a disc player.

European Published Patent Application No. 0 626 690 describes a digital playing device for audio discs in which digital audio data is written into a memory at a speed which is greater than or equal to a speed corresponding to normal reproduction speed. The data is read out from this memory at the normal reproduction speed. This makes it possible for two music pieces to be reproduced one after the other, without an intervening pause. A fading control unit is also provided which controls the volume at the transition of two music pieces which are to be played one after the other.

European Published Patent Application No. 0 249 781 describes a compact disc (CD) player for playing so-called CD discs which has a read/write memory in the digital data processing path of the signal processing unit to buffer the data for the purpose of providing electronic compensation of track jumps made by the scanning optics due to vibrations or bumps.

The data is continuously read out from the memory, with the read-out process being continued without interruption even if the scanning optics lose the track. The repositioning device resets the scanning optics.

SUMMARY OF THE INVENTION

By contrast, the disc player according to the present invention has the advantage that, even when track jumps occur which are not synchronously repositioned, continuous reading of the read/write memory is possible to play excerpts of music pieces stored on a disc one after the other. This makes it possible to run through the disc quickly, which allows the user to get an overview and a selection of music pieces, without disturbing his listening pleasure.

It is advantageous, to provide the jump times during which a scanning optics makes a track jump. This makes it possible to run through the disc quickly, to get a representative cross-section of the music pieces on the disc.

It is advantageous, to store a sufficiently large quantity of data in the read/write memory at the first clock rate in order to ensure that the data can be reproduced at the second clock rate throughout the entire duration of the jump times. This means that the user does not perceive the track jumps as an interruption of the reproduction.

It is advantageous if a control unit is used, to which the first clock rate is fed and which feeds to the read/write memory the second clock rate, the address of the data to be output, and the address of the data to be read in, and which is connected with a servo unit to control the scanning optics as a function of the first clock rate. This makes possible track jumps to specified track positions and efficient management of the data stored in the read/write memory, above all involving a read-in and read-out process, exactly as is the case with the control of the first and the second clock rate to ensure that the playback process is continuous and free of interruptions.

It is advantageous to evaluate the data's volume, rhythm, audio frequency, etc., using an evaluation unit which is connected with the control unit, to maintain a specified volume, a specified rhythm, and a specified audio frequency, etc. The result is that the acoustically reproduced data sequences which are strung together match one another musically, and thus do not disturb the user's listening pleasure.

Figure 1:
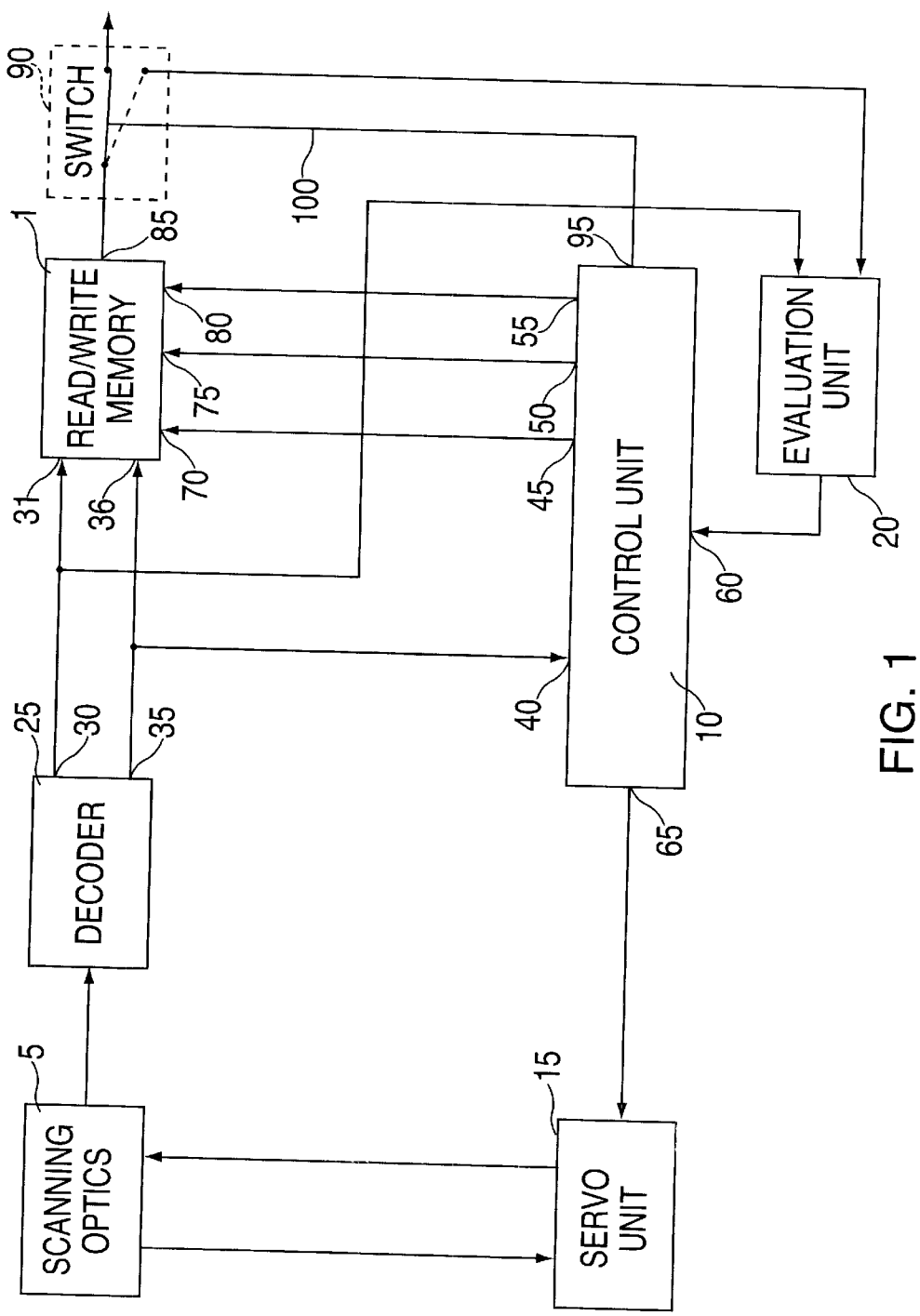
FIG. 1 shows a circuit arrangement for a disc player according to an embodiment of the present invention.

CD player; the scanning optics, together with a servo unit 15, form a control loop. The data which is read by the scanning optics 5 from a disc in the form of a compact disc is decoded in a decoder 25. The data is optically and digitally stored in tracks of the compact disc. The decoder 25 has a first output 30 to output data and a second output 35 to output a first clock rate. The first output 30 of the decoder 25 is connected with a first input 31 of a read/write memory 1 for data input and the second output 35 of the decoder 25 is connected with a second input 36 of the read/write memory 1 for input of the first clock rate. The read/write memory 1 has a data output 85 to output data which is then played, in a manner known in the art, so that it can be heard. The second output 35 of the decoder 25 is also connected with a first input 40 of a control unit 10 to input the first clock rate. The control unit 10 also has a first output 45 to output an address for the data to be read in from the read/write memory 1 at its first input 31, a second output 50 to output an address for the data to be read out at data output 85 of the read/write memory 1, and a third output 55 to deliver a second clock rate to the read/write memory. The first output 45 of the control unit 10 is connected with a third input 70 of read/write memory 1 to receive the address for the data to be read in. The second output 50 of the control unit 10 is connected with a fourth input 75 of the read/write memory 1 to receive the address for the data to be read out. The third output 55 of the control unit 10 is connected with a fifth input 80 of the read/write memory 1 to receive the second clock rate. The data is also passed on from the first output 30 of the decoder 25 to an evaluation unit 20, which is also connected with a second input 60 of the control unit 10 to receive the data evaluation. Finally, the control unit 10 is connected with the servo unit 15 through a fourth output 65 to deliver control signals.

Figure 2:
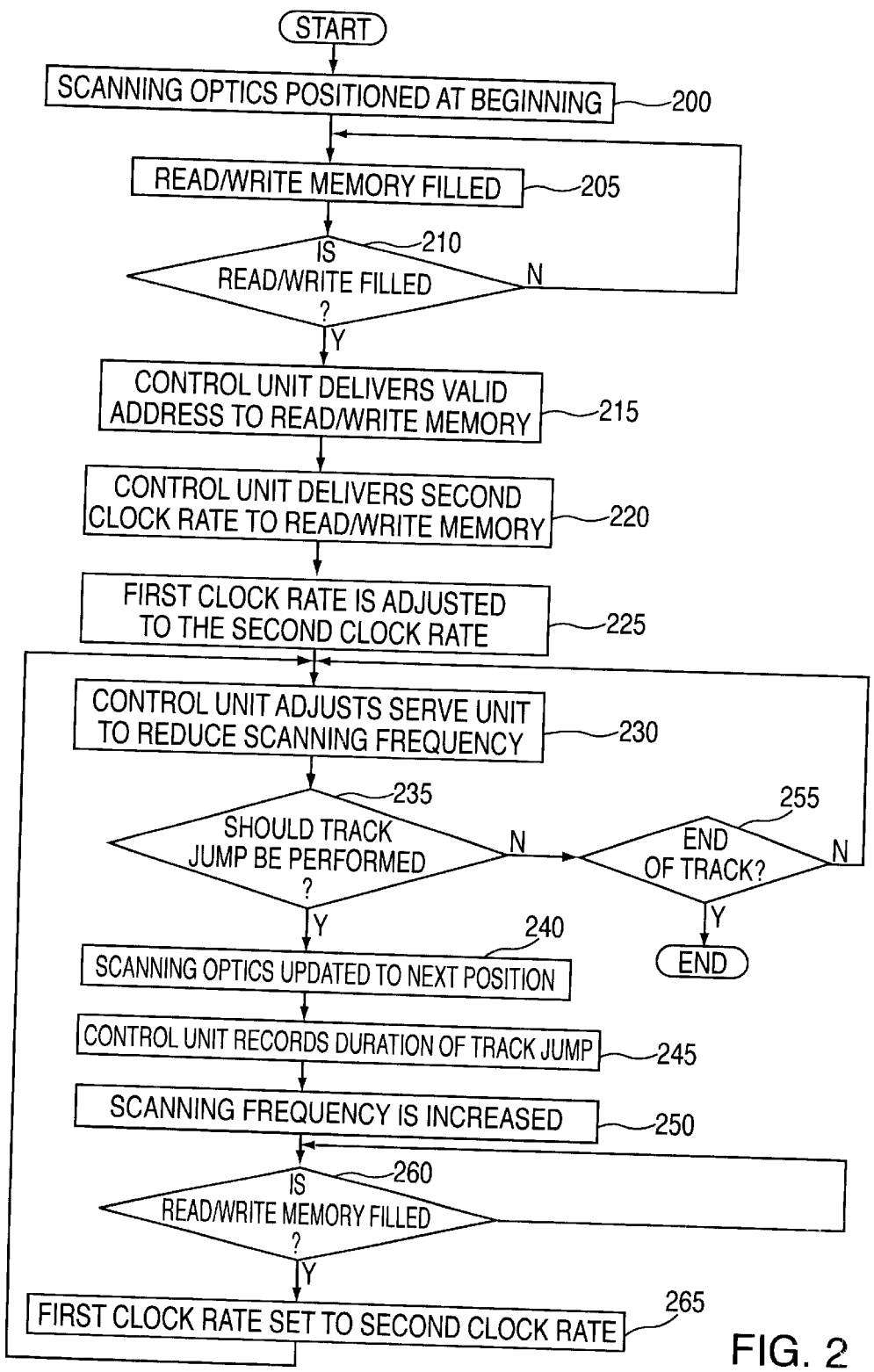
FIG. 2 shows a flow chart of a method for an operating mode in which excepts of music pieces stored on a compact disc are played one after the other according to an embodiment of the present invention.

The CD player according to the present invention with the circuit arrangement shown in the figure makes possible an operating mode in which excerpts of music pieces stored on a compact disc are played one after the other according to the timing diagram in FIG. 2. If the user selects this operating mode, then at program point 200 the scanning optics are positioned, for example, at a position which marks the beginning of the first music piece. Then, at program point 205, the read/write memory 1 is filled, beginning at the address for the data to be read in which the control unit 10 delivers to the read/write memory 1, with the data in the form of data blocks, which is optically and digitally stored in the tracks of the compact disc and which is read by the scanning optics 5 and decoded by the decoder 25. After each storage place is occupied according to program point 205, a check is made as to whether the read/write memory is filled. If this is the case, then the program branches to point 215, otherwise it loops back to program point 205 and continues the filling process. At program point 215 the control unit 10 delivers to the read/write memory a valid address for the data to be read out. This address corresponds to the beginning of the address for the data first read in. In this way, at the beginning after the read/write memory 1 is filled, the data which identifies the beginning of the first music piece is thus delivered to the data output 85 of the read/write memory 1 and is played, in a manner known in the art, so that it can be heard. This takes place at the second clock rate, which is constant and which the control unit 10 also delivers at program point 220 to the read/write memory 1. This second clock rate is then used to read the data out of the read/write memory 1 until the end of the program, that is, the playing of excerpts one after the other. The read/write memory 1 is filled at the first clock rate, which is variable. The first and the second clock rates can be produced by a quartz oscillator (not shown in the figure), which can be connected with a first frequency divider (also not shown) having a fixed division ratio to form the second clock rate, and with a second frequency divider (also not shown), whose division ratio can be variably adjusted by control unit 10. The variable first clock rate and the constant second clock rate are then available at the outputs of the respective frequency dividers. Depending on the first clock rate fed through the first input 40 to the control unit 10, the servo unit 15 is controlled in such a way that the scanning frequency of the compact disc and the disc speed are appropriately adjusted to the first clock rate. To save time, it is useful for the initial writing process of the read/write memory 1 to use a first clock rate which is greater than the second clock rate. The scanning frequency of the compact disc and the disc speed are then also correspondingly increased. Since the first clock rate and the storage capacity of the read/write memory 1 are known in the control unit 10, the point in time is also known at which the read/write memory 1 is completely filled and the address of the data to be read out should be set equal to the address of the data first read in, so that the query at program point 210 about how full the read/write memory 1 is can also be realized as a time query. At program point 225 the first clock rate is then adjusted to the second clock rate, and at program point 230 control unit 10 acts on servo unit 15 to reduce the scanning frequency of the compact disc and the disc speed to the appropriate level. Read/write memory 1 is then overwritten with new data to the extent that the old data is delivered to data output 85. This makes the entire contents of read/write memory 1 available for a track jump, to be continuously read during the track jump at the constant second clock rate, so that the maximum duration for a track jump is determined by the second clock rate and the size of the read/write memory 1, under the assumption that the track jump should not affect listening pleasure. The condition for the control unit 10 bringing about a track jump is the read/write memory 1 being completely filled with data. If this condition is met, then a track jump can be performed at times specified, for example, by the user on an input unit (not shown in FIG. 1) which is connected with the control unit 10. At program point 235 control unit 10 checks whether a track jump should be performed. If this is the case, then the program branches to program point 240, otherwise it branches to program point 255. At program point 240 the control unit 10 sends servo unit 15 a corresponding control signal, which positions the scanning optics at the next position to be read. During the track jump the data stored in read/write memory 1 continues to be read out at the constant second clock rate, so that the user's listening pleasure is not disturbed. At program point 245 control unit 10 records the duration of the track jump, and can determine from it how full read/write memory 1 will be after the track jump ends. After the track jump ends, the first clock rate is increased at program point 250 so that it is greater than the second clock rate, to completely refill read/write memory 1. The scanning frequency of the compact disc and the disc speed are also correspondingly increased at program point 250. At program point 260 a check is made whether the read/write memory 1 has been completely refilled. If this is the case, then the program branches to point 265, otherwise it branches to program point 250 and processing continues at a higher clock rate. If read/write memory 1 has been completely refilled, then at program point 265 the first clock rate is set to the value of the second clock rate and the program branches to point 230, where the scanning frequency of the compact disc and the disc speed are correspondingly adjusted. At program point 255 a check is made whether the end of the track on the compact disc has been reached. If this is the case, then the program ends, otherwise the program branches to point 230 and servo unit 15 continues to be appropriately controlled by control unit 10.

In normal operation without track jumps, the address of the data to be read out is constantly adjusted to the address of the data first read in, and the address of the data to be read in is cyclically corrected to the address of the data to be read out, for example by adjusting it to the address of the data last read out. This allows control unit 10 to manage read/write memory 1 in an efficient manner.

During a track jump control unit 10 does not deliver to the read/write memory 1 any address for the data to be read in, so that no new data can be stored in the read/write memory at this time.

After a track jump ends, or after the length of time determined for it has passed, control unit 10 once again sends read/write memory 1 an address for data to be read in, so that new data from the decoder 25 can be written into the read/write memory 1. The areas of the read/write memory 1 that are addressed for data to be read in are those which were already read out during the preceding track jump, so that, given the above-described mode of addressing, when read/write memory 1 is refilled, the address for the data to be read in by control unit 10 is set to the address of the data just read out.

One possible embodiment for performing defined track jumps is to use the evaluation unit 20. The evaluation unit 20 also receives the data fed to read/write memory 1. Evaluation unit 20 evaluates the data's volume, rhythm, audio frequency, etc. Depending on how the data is evaluated by evaluation unit 20, control unit 10 delivers jump commands to servo unit 15 which cause the scanning optics 5 to make appropriate track jumps at program point 240 to maintain a specified volume, a specified rhythm, a specified audio frequency, etc.

This can also be accomplished by the arrangement shown in the Figure, in which data output 85 of read/write memory 1 has a switch 90 on it, which is connected through a control cable 100 with a switch control output 95 of control unit 10 and which connects data output 85 of read/write memory 1 alternatively with either a digital-to-analog converter (not shown in the figure) for further processing the data, or with evaluation unit 20. This means that control unit 10 can also evaluate the data stored in read/write memory 1 through evaluation unit 20, and can determine, on the basis of how the data is evaluated in evaluation unit 20, addresses in the read/write memory 1 containing data having a specified volume, a specified rhythm, a specified audio frequency, etc. These addresses are then transferred as read-out addresses through the fourth input 75 to read/write memory 1, so that track jumps are not necessary and so that substantially less stress is placed on the scanning optics 5. Then, an address jump in read/write memory 1 is performed at program point 240 instead of a track jump, and determining the effective state of filling of read/write memory 1 at program point 245 involves determining the number of memory locations in the read/write memory 1 that are skipped, instead of determining the duration of the track jump. To prevent data loss at the digital-to-analog converter (not shown in the figure) behind switch 90, its input data is correspondingly buffered.

This ability to take the data properties into consideration is made possible by separating the reproduction of data from the process of reading it off the compact disc. This makes it possible to prevent going from a place with quiet music directly to a place with loud music, from a place with a low audio frequency to a place with a high audio frequency, from a place with a slow rhythm to a place with a fast rhythm, etc., which would disturb the listening pleasure of the user.

Control unit 10, with the help of evaluation unit 20, also allows track jumps to the beginnings of the subsequent music pieces.

It is not absolutely necessary for read/write memory 1 to be completely filled if the jump times are correspondingly small. This makes it possible to shorten the time between two track jumps, since read/write memory 1 does not have to be completely filled after a track jump.

Using the disc player according to the present invention makes it possible not only to make the track jumps for playing excerpts of music pieces stored on a disc one after the other, but also to bridge track losses triggered, for example, by vibrations or disturbances in the servo unit 15. The correct track position can then readjusted by suitable repositioning devices, which should be provided as appropriate.

What is claimed is:

1. A disc player for playing a disc including optically stored data digitally stored in tracks, comprising:

a read/write memory for buffering blocks of data that are read into the read/write memory at a first clock rate and are read out of the read/write memory at a second clock rate, the first clock rate being greater than or equal to the second clock rate, wherein an operating mode is provided for effecting a play back of excerpts of audible sound pieces stored on the disc one after another; and an evaluation unit disengagingly coupled to the read/write memory for evaluating data of the audible sound pieces read out of the read/write memory that are to be played back one after the other, the evaluating being performed with respect to at least one of a volume, a rhythm, and an audio frequency to maintain at least one of a corresponding specified volume, rhythm, and audio frequency.

2. The disc player according to claim 1, wherein:

the audible sound pieces correspond to music sound pieces.

3. The disc player according to claim 1, further comprising:

a scanning unit including scanning optics for performing a track jump during jump times.

4. The disc player according to claim 1, wherein:

a sufficiently large quantity of data is capable of being stored in the read/write memory at the first clock rate to ensure that data can be reproduced at the second clock rate throughout an entire duration of jump times.

5. The disc player according to claim 3, further comprising:

a servo-unit for controlling the scanning unit as a function of the first clock rate; and a control unit to which the first clock rate is fed and which feeds to the read/write memory the second clock rate, an address of data to be output, and an address of data to be read in.

6. The disc player according to claim 5, wherein:

data fed to the read/write memory is capable of being fed to the evaluation unit to evaluate the volume, the rhythm, and the audio frequency in data fed to the evaluation unit, and the evaluation unit is connected with the control unit.

7. The disc player according to claim 5, wherein:

the control unit delivers jump commands to the servo unit, the jump commands depending on how data is evaluated by the evaluation unit causing the scanning optics to make appropriate track jumps to maintain the specified volume, the specified rhythm, and the specified audio frequency.

8. The disc player according to claim 5, wherein:

the control unit determines, on the basis of how data is evaluated by the evaluation unit, addresses in the read/write memory containing data having the specified volume, the specified rhythm, and the specified audio frequency.

\* \* \* \* \*

UNITED STATES PATENT AND TRADEMARK OFFICE
CERTIFICATE OF CORRECTION

PATENT NO.     : 6,463,017 B1
DATED          : October 8, 2002
INVENTOR(S)    : Dieter Baas It is certified that error appears in the above-identified patent and that said Letters Patent is hereby corrected as shown below:

Column 2,
Line 7, change "CD Player; the" to -- In the figure, the number 5 designates the scanning optics of the disc player in the form of a CD player; the --

Signed and Sealed this

Eleventh Day of November, 2003

JAMES E. ROGAN
*Director of the United States Patent and Trademark Office*